(12) United States Patent
Chen

(10) Patent No.: US 8,302,508 B2
(45) Date of Patent: Nov. 6, 2012

(54) TWO-WAY PROPELLING TYPE TRANSMISSION MECHANISM FOR BICYCLE

(76) Inventor: Jung-Chieh Chen, Taichung (TW)

( * ) Notice: Subject to any disclaimer, the term of this patent is extended or adjusted under 35 U.S.C. 154(b) by 308 days.

(21) Appl. No.: 12/855,005

(22) Filed: Aug. 12, 2010

(65) Prior Publication Data

US 2012/0036959 A1    Feb. 16, 2012

(51) Int. Cl.
*F16H 3/00* (2006.01)
(52) U.S. Cl. ............................................. 74/810.1
(58) Field of Classification Search ............... 74/810.1, 74/810.2, 376, 355, 361, 665 A
See application file for complete search history.

(56) References Cited

U.S. PATENT DOCUMENTS

| 5,765,847 A * | 6/1998 | Toronto et al. | 280/237 |
| 5,884,927 A * | 3/1999 | Mahaney et al. | 280/237 |
| 5,918,894 A * | 7/1999 | Toronto et al. | 280/237 |
| 6,383,107 B1 * | 5/2002 | Yoo | 475/12 |
| 6,419,252 B1 * | 7/2002 | Park et al. | 280/237 |
| 7,445,223 B2 * | 11/2008 | Hong | 280/260 |
| 2003/0034627 A1 * | 2/2003 | Kim et al. | 280/237 |

* cited by examiner

*Primary Examiner* — Ha D. Ho
*Assistant Examiner* — Jude Agendia
(74) *Attorney, Agent, or Firm* — Rosenberg, Klein & Lee

(57) ABSTRACT

A two-way propelling type transmission mechanism for bicycle is disclosed having a control line operable to pull a bearing ring and a directional gear away from the series of clutch teeth of a first gear into engagement with the series of clutch teeth of a second gear so that pedaling the pedals to rotate cranks either forwardly or backwardly can drive the first gear to rotate a gear cluster in moving the bicycle forwards.

1 Claim, 4 Drawing Sheets

TWO-WAY PROPELLING TYPE TRANSMISSION MECHANISM FOR BICYCLE

BACKGROUND OF THE INVENTION

1. Field of the Invention

The present invention relates to a transmission mechanism for bicycle and more particularly, to a two-way propelling type transmission mechanism for bicycle, which can be propelled either forwardly or backwardly to move the bicycle, allowing the user to apply force to the pedals through different parts of the soles of the legs.

2. Description of the Related Art

A transmission mechanism for bicycle is known comprising a driving axle, a gear cluster mounted on one end of the driving axle for synchronous rotation, two pedals, two cranks coupled between the two ends of the driving axle and the two pedals. When pedaling the pedals to rotate the cranks forwards, the gear cluster is rotated with the driving axle to move the bicycle forwards. On the contrary, when pedaling the pedals to rotate the cranks backwards, the driving axle is rotated counter-clockwise without moving the gear cluster. Therefore, the driving axle runs idle when the user pedals the pedals backwards. Thus, the user can propel the pedals to move the bicycle forwards only applying a force through the front part (the toes) of the sole of each leg. The front part of the sole of each leg will become tired and painful soon when pedaling the pedals of the bicycle in this manner.

SUMMARY OF THE INVENTION

The present invention has been accomplished under the circumstances in view. It is one object of the present invention to provide a two-way propelling type transmission mechanism for bicycle, which can be propelled either forwardly or backwardly to move the bicycle, allowing the user to apply force to the pedals through different parts of the soles of the legs.

To achieve this and other objects of the present invention, a two-way propelling type transmission mechanism for bicycle comprises a driving axle, a first gear and a second gear mounted on the driving axle, a directional gear mounted on the driving axle between the first and second gears, a transmission shaft, a first transmission gear mounted on one end of the transmission shaft and meshed with the first gear, a second transmission gear, a chain coupled between the second transmission gear and the second gear, and a control line operable to pull the directional gear away from a series of clutch teeth at the first gear into engagement with a series of clutch teeth at the second gear so that pedaling the pedals to rotate cranks either forwardly or backwardly can drive the first gear to rotate a gear cluster in moving the bicycle forwards subject to the control of the control line.

DETAILED DESCRIPTION OF THE PREFERRED EMBODIMENT

Figure 1:
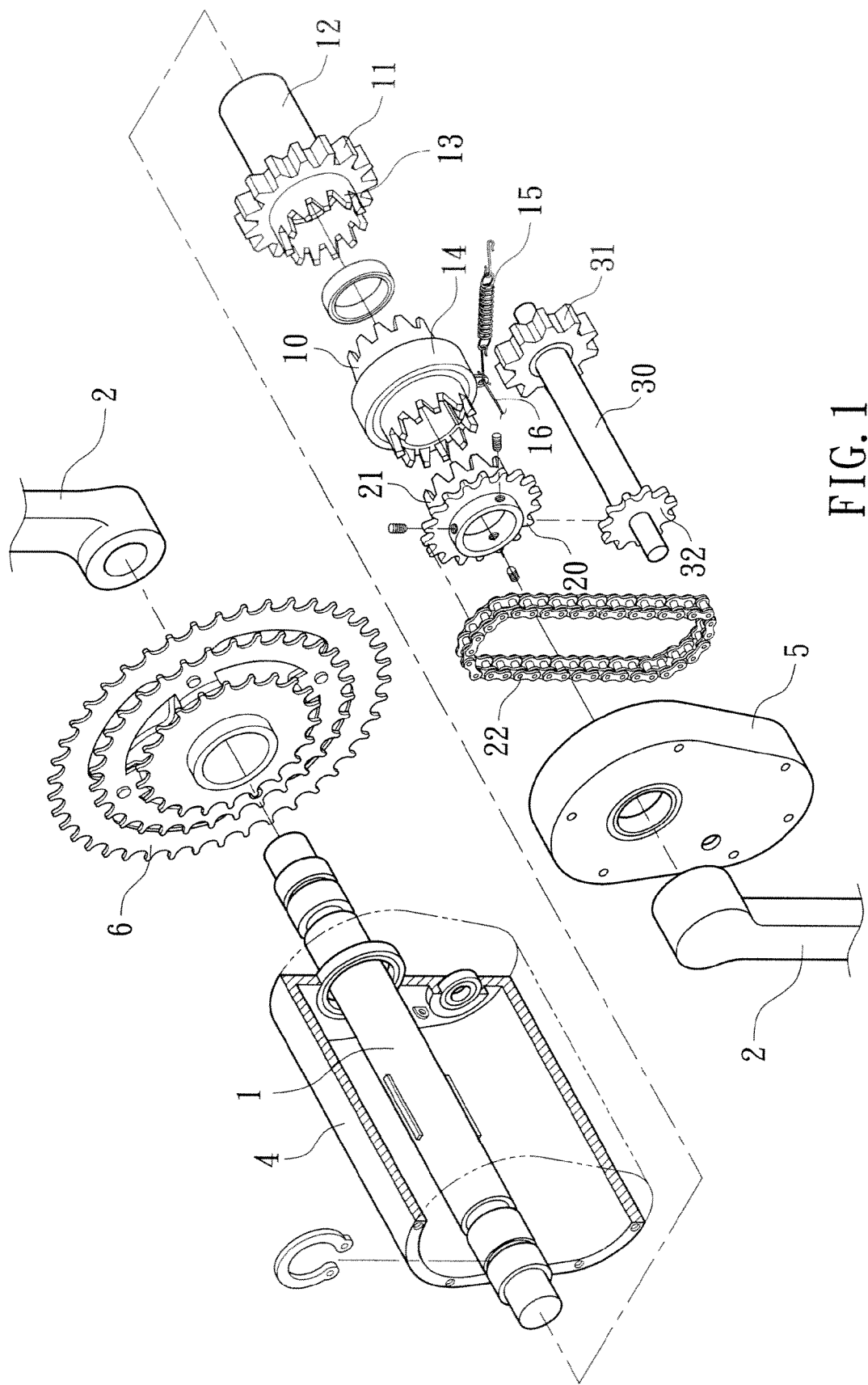
FIG. 1 is an exploded view of a two-way propelling type transmission mechanism for bicycle in accordance with the present invention.
Figure 2:
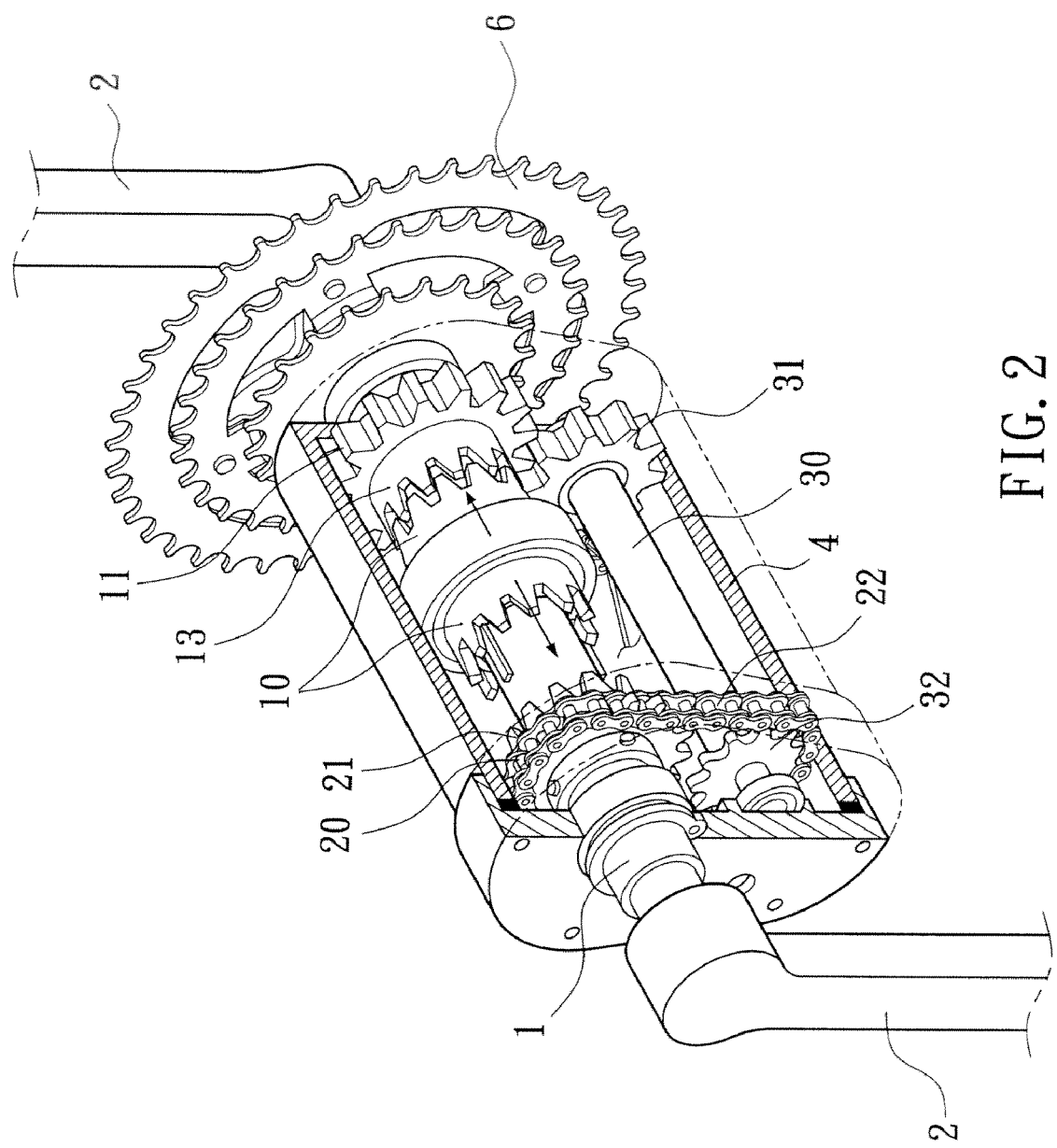
FIG. 2 is an elevational assembly view of the two-way propelling type transmission mechanism for bicycle in accordance with the present invention.

Referring to FIGS. 1~4, a two-way propelling type transmission mechanism for bicycle in accordance with the present invention is shown comprising a casing 4 covered with a cover 5, a driving axle 1 rotatably supported in the casing 4, two pedals 3 suspending outside the casing 4, two cranks 2 coupled between the two ends of the driving axle 1 and the two pedals 3, a directional gear 10 mounted on the driving axle 1 inside the casing 4, a first gear 11 mounted on the driving axle 1 in the casing 4 and disposed at one side relative to the directional gear 10 and having a tubular gear shaft 12 and a series of clutch teeth 13 located on one end of the tubular gear shaft 12, a gear cluster 6 mounted on the other end of the tubular gear shaft 12 outside the casing 4 and remote from the series of clutch teeth 13, a second gear 20 mounted on the driving axle 1 in the casing 4 and disposed at an opposite side relative to the directional gear 10 and having a series of clutch teeth 21 at its one side, a transmission axle 30 rotatably mounted in the casing 4 and arranged in a parallel manner relative to the driving axle 1, a first transmission gear 31 fixedly mounted on one end of the transmission axle 30 and meshed with the first gear 11, a second transmission gear 32 fixedly mounted on the other end of the transmission axle 30, a chain 22 coupled between the second gear 20 and the second transmission gear 32, a bearing ring 14 mounted on the directional gear 10, a pull spring 15 connected to the bearing ring 14 and imparting a pull force to the bearing ring 14 and the directional gear 10 to keep the directional gear 10 in mesh with the series of clutch teeth 13 of the first gear 11, and a control line 16 connected to the bearing ring 14 and operable to pull the bearing ring 14 and the directional gear 10 away from the series of clutch teeth 13 of the first gear 11 into engagement with the series of clutch teeth 21 of the second gear 20.

The operation of the two-way propelling type transmission mechanism is described hereinafter.

Figure 3:
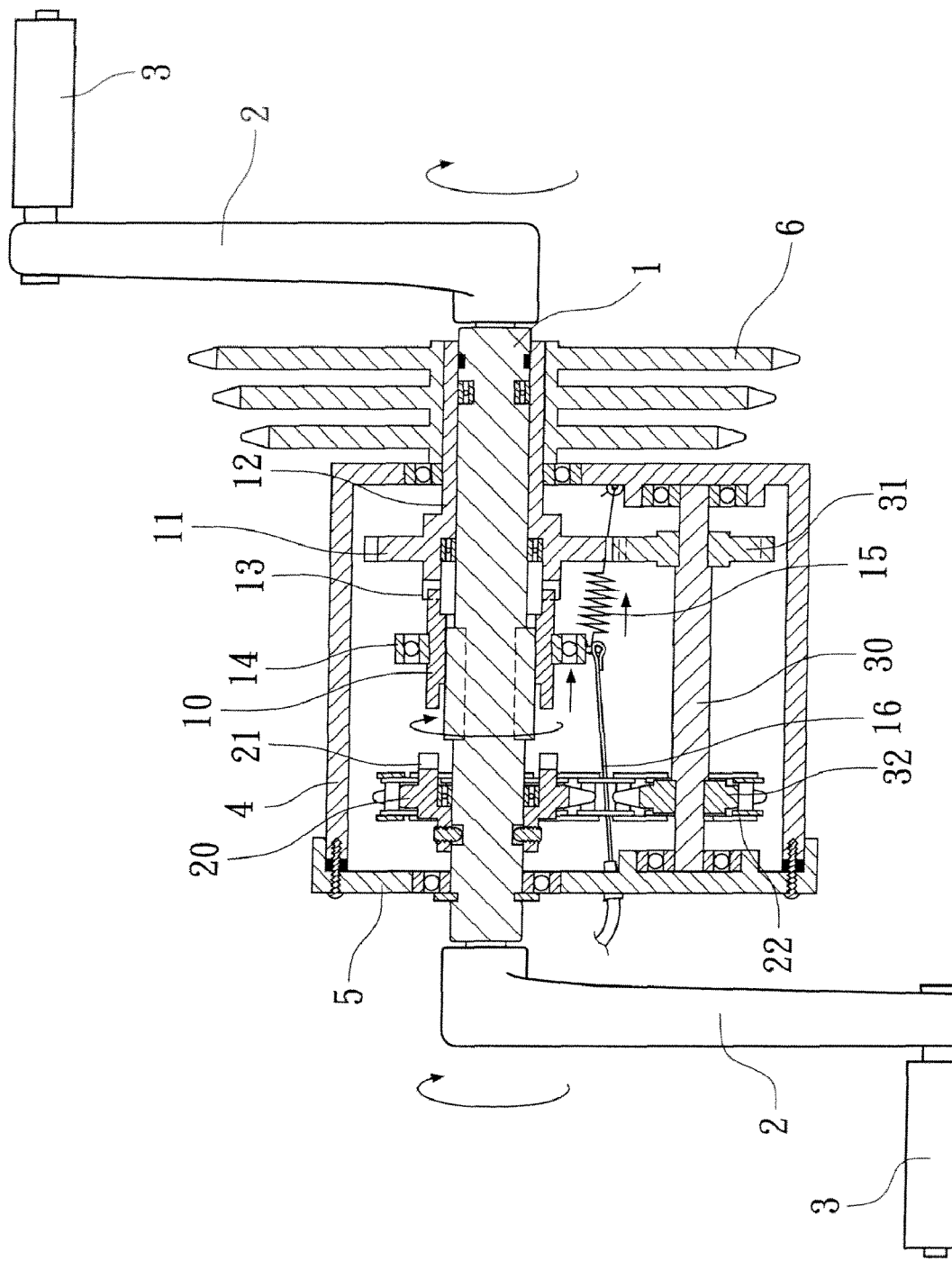
FIG. 3 is a schematic sectional view of the present invention, showing the two-way propelling type transmission mechanism for bicycle forwardly propelled.

When the user propels the pedals 3 forwardly, as shown in FIG. 3, the cranks 2 are rotated forwards (clockwise), the directional gear 10 is meshed with the series of clutch teeth 13 of the first gear 11 and disengaged from the series of clutch teeth 21 of the second gear 20. At this time, the second gear 20 is immovable, and the first gear 11 is rotated forwards (clockwise), causing the gear cluster 6 to be rotated with the tubular gear shaft 12 of the first gear 11 to move the bicycle forwards.

Figure 4:
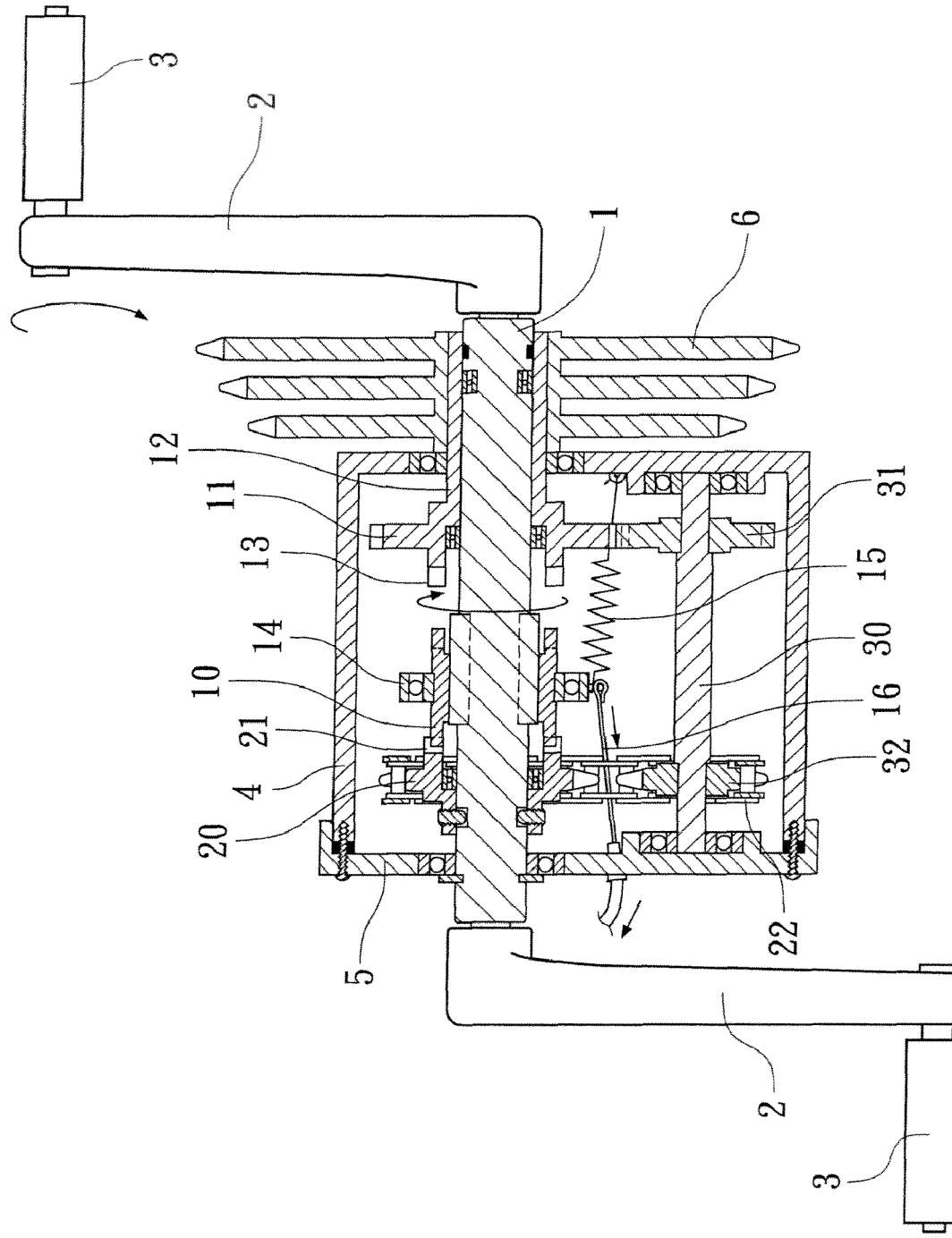
FIG. 4 is a schematic sectional view of the present invention, showing the two-way propelling type transmission mechanism for bicycle backwardly propelled.

On the contrary, when pedaling the pedals 3 backwardly, as shown in FIG. 4, operate the control line 16 to pull the bearing ring 14 and the directional gear 10 away from the series of clutch teeth 13 of the first gear 11 into engagement with the series of clutch teeth 21 of the second gear 20. At this time, the driving axle 1 is rotated with the cranks 2 backwards (counter-clockwise). Because the directional gear 10 is disengaged from the series of clutch teeth 13 of the first gear 11 and meshed with the series of clutch teeth 21 of the second gear 20 at this time, the second gear 20 is rotated with the directional gear 10 backwards (counter-clockwise) to move the chain 22, the second transmission gear 32, the transmission axle 30, causing the first transmission gear 31 to rotate the first gear 11 forwards (clockwise), and therefore the gear cluster 6 is rotated with the tubular gear shaft 12 of the first gear 11 to move the bicycle forwards.

Thus, pedaling the pedals 3 to rotate the cranks 2 either forwardly or backwardly, the gear cluster 6 can be rotated with the tubular gear shaft 12 of the first gear 11 to move the bicycle forwards, allowing the user to apply force to the pedals 3 through different parts of the soles of the legs.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A two-way propelling type transmission mechanism for bicycle, comprising a casing covered with a cover, a driving axle rotatably supported in said casing, two pedals suspending outside said casing, two cranks coupled between two opposing ends of said driving axle and said two pedals, a directional gear mounted on said driving axle inside said casing, a first gear mounted on said driving axle in said casing and disposed at one side relative to said directional gear and having a tubular gear shaft and a series of clutch teeth located on one end of said tubular gear shaft, a gear cluster mounted on an opposite end of said tubular gear shaft outside said casing, a second gear mounted on said driving axle in said casing and disposed at an opposite side relative to said directional gear and having a series of clutch teeth at one side thereof, a transmission axle rotatably mounted in said casing and arranged in a parallel manner relative to said driving axle, a first transmission gear fixedly mounted on one end of said transmission axle and meshed with said first gear, a second transmission gear fixedly mounted on an opposite end of said transmission axle, a chain coupled between said second gear and said second transmission gear, a bearing ring mounted on said directional gear, a pull spring connected to said bearing ring and imparting a pull force to said bearing ring and said directional gear to keep said directional gear in mesh with the series of clutch teeth of said first gear, and a control line connected to said bearing ring and operable to pull said bearing ring and said directional gear away from the series of clutch teeth of said first gear into engagement with the series of clutch teeth of said second gear.

* * * * *